United States Patent

[11] 3,607,836

[72] Inventor  Richard L. Smith
               Chattanooga, Tenn.
[21] Appl. No. 799,528
[22] Filed     Feb. 14, 1969
[45] Patented  Sept. 21, 1971
[73] Assignee  Velsicol Chemical Corporation
               Chattanooga, Tenn.

[54] NEW COLOR IMPROVED POLYESTERS OF CHLORENDIC ACID OR ANHYDRIDE
4 Claims, No Drawings

[52] U.S. Cl. .................................... 260/75,
                          117/137, 260/45.7, 260/45.95
[51] Int. Cl. ........................................ C08g 17/10,
                                                     C08g 51/58
[50] Field of Search ........................... 260/45.95,
                                    45.7 P, 75 P, 75 H

[56] References Cited
UNITED STATES PATENTS

| | | | |
|---|---|---|---|
| 2,727,928 | 12/1955 | Menn ............................ | 260/45.95 |
| 3,361,846 | 1/1968 | Gleim et al. ................. | 260/45.95 |
| 3,365,424 | 1/1968 | Dunkel ......................... | 260/75 |
| 3,367,905 | 2/1968 | Zimberg et al. ............. | 260/45.7 |

Primary Examiner—Donald E. Czaja
Assistant Examiner—V. P. Hoke
Attorney—Robert J. Schwarz ABSTRACT: This invention discloses the improvement in the preparation of unsaturated polyesters of chlorendic acid or anhydride which comprises carrying out the esterification reaction in the presence of a color inhibiting amount of a combination of phosphoric acid and 2,6-di-t-butyl-p-cresol.

3,607,836

NEW COLOR IMPROVED POLYESTERS OF CHLORENDIC ACID OR ANHYDRIDE

This invention relates to new polyester resin compositions and to the method of their preparation. More particularly this invention relates to color improved fire retardant unsaturated polyesters containing as one component a chlorendic moiety.

Polyester resin compositions possessing fire retardant properties are of great commercial importance. Such compositions can be utilized in those areas of application where sparks, open flame or fire are likely to occur or present a potential hazard. Examples of such applications are in electric components such as printed circuit boards and electric wiring, in structural materials such as wall paneling and corrugated roofing and such miscellaneous applications as fuel tanks, aircraft components, and the like.

Fire retardant polyesters having great value are polyesters of chlorendic acid, its anhydride or its lower aliphatic esters. These polyesters are well known in the art and their preparation is fully described in U.S. Pats. No. 2,779,701 and 2,783,215. While these polyester resins possess the valuable fire retardant properties required for a great variety of commercial applications they have not been of sufficiently light color to be totally accepted in those applications wherein particularly light colored articles are desired. Thus in those applications wherein decorative as well as fire retardant properties are required, such as for protective coatings or wall paneling, and wherein it is essential that the polyester resins be of a very light color, the polyesters prepared with chlorendic acid, its anhydride or esters have often been unsuited.

The color of fire retardant polyesters containing the chlorendic group is caused by color producing impurities contained in the chlorendic acid or its anhydride. These impurities result from the process by which chlorendic acid or its anhydride is prepared. Thus, chlorendic acid or its anhydride which is prepared by the adduction of hexachlorocyclopentadiene and maleic acid or its anhydride will result in a chlorendic acid or anhydride containing trace amount of color producing impurities. While the nature and mode of color impartation of all of these impurities is not fully understood, it has been found that the presence of hexachlorocyclopentadiene in an amount greater than about 0.01 percent by weight, octachlorocyclopentene in an amount greater than about 0.001 percent by weight or iron in an amount greater than 0.1 part per million in the chlorendic acid or anhydride will cause a substantial amount of color in a polyester prepared therefrom.

The refining of chlorendic acid or anhydride to remove the color producing impurities such that polyesters prepared therefrom are of very light color such as colors of less than 2 on the Gardner scale, while possible, is not practical since costly additional processing steps are required.

It has now been found that a color improved unsaturated fire retardant polyester of chlorendic acid or its anhydride which has been prepared by the adduction of hexachlorocyclopentadiene and maleic anhydride can be readily prepared by incorporating into the reaction mixture, during the preparation of said polyester a color inhibiting amount of a combination consisting of phosphoric acid and 2,6-di-*t*-butyl-*p*-cresol.

The unsaturated polyesters of chlorendic acid or anhydride are well known in the art and generally comprise the reaction product of at least one polyhydric alcohol, a polycarboxylic compound and chlorendic acid or its anhydride.

Thus, one embodiment of the present invention resides in a new color improved unsaturated fire retardant polyester of chlorendic acid or anhydride. A more specific embodiment of the present invention is a color improved unsaturated fire retardant polyester which comprises the product obtained by reacting at least one polyhydric alcohol, a polycarboxylic compound and chlorendic acid or its anhydride containing color producing impurities in the presence of a color improving amount of a combination of phosphoric acid and 2,6-di-*t*-butyl-*p*-cresol.

Another embodiment of this invention resides in a process of preparing unsaturated polyesters of chlorendic acid or anhydride which have been prepared by the adduction of hexachlorocyclopentadiene and maleic anhydride in the presence of a color inhibiting amount of a combination of phosphoric acid and 2,6-di-*t*-butyl-*p*-cresol.

A further embodiment of this invention resides in a method of preparing color improved unsaturated fire retardant polyesters which comprises reacting at least one polyhydric alcohol, a polycarboxylic compound and chlorendic acid or its anhydride containing color producing impurities in the presence of color inhibiting amounts of a combination of phosphoric acid and 2,6-di-*t*-butyl-*p*-cresol.

As heretofore indicated the polyesters of the present invention are unsaturated and are therefore capable of further reaction by copolymerization with monomers having vinylic unsaturation. This unsaturation is imparted to the polyester via the polyhydric alcohol or the polycarboxylic compound, at least one of which contains a carbon to carbon double bond which remains unbroken during the reaction.

Exemplary polyhydric alcohols suitable for preparing the polyesters of this invention are ethylene glycol, propylene glycol, butylene glycol, diethylene glycol, dipropylene glycol, triethylene glycol, tripropylene glycol, 2-butenediol-1,4, pentaerithritol, neopentyl glycol, and the like.

Polycarboxylic compounds for preparing the polyesters of the present invention comprise polybasic acids and the anhydrides and esters thereof. Examples of such compounds include maleic acid, maleic anhydride, fumaric acid, citraconic acid, itaconic acid, phthalic acid, phthalic anhydride, isophthalic acid, succinic acid, adipic acid, azelaic acid, sebacic acid, glutaric acid, and the like.

The preparation of the polyesters of the present invention can be carried out in a manner similar to that utilized for the preparation of unsaturated polyesters in general, provided that the reaction of the polyol with the polycarboxylic compound and the chlorendic acid or its anhydride is performed in the presence of a combination of phosphoric acid and 2,6-di-*t*-butyl-*P*-cresol. Thus the polyesters of this invention can be prepared by reacting at polymerization conditions one or more polyhydric alcohols with about an equimolar amount of the polycarboxylic compound and the chlorendic acid or anhydride in the presence of a color inhibiting amount of the combination of phosphoric acid and 2,6-di-*t*-bytyl-*p*-cresol. It can be desirable, in some instances, to use slight excess molar amounts of the polyhydric alcohols.

The process for preparing the polyesters of this invention can be carried out in conventional esterification equipment such as an appropriate reaction vessel equipped with heating, stirring and temperature sensing means, with a reflux column and a water trap. The reaction vessel can also be equipped with means for providing an inert atmosphere to the vessel such as nitrogen or carbon dioxide to assist in the exclusion or the removal of oxygen from the reaction site.

The process for preparing the polyesters of the present invention can be effected by well-known techniques such as the fusion cook or solvent methods. For example, the reactants can be combined with a quantity of an inert organic solvent such as liquid aromatic hydrocarbons of the benzene series and heated to reflux. The water formed in the esterification reaction is thereby azeotroped with the inert solvent and is removed from the reaction site. The inert solvent remaining in the reaction mixture at or near the end of the reaction can be removed by heating, by application of a vacuum or both to yield the desired polyester. In the fusion cook method the reactants are combined substantially free of any solvents and are heated at temperatures above the boiling point of water to remove the water of esterification as it is formed. When polyester resins free or solvent are desired the fusion cook method of preparing the polyesters is preferred.

The temperature at which the esterification process of this invention can be carried out can range from about 100° C. to about 200° C. depending upon the particular reactants used or upon the reflux temperature of the reaction mixture. A preferred temperature range for preparing the polyesters by the fusion cook method is from about 150° C. to about 190° C.

The phosphoric acid and 2,6-di-*t*-butyl-*p*-cresol which are utilized in preparing the color improved polyesters can be added individually or in combination to the reaction mixture before or during the addition of the chlorendic acid or its anhydride. The quantity of phosphoric acid and 2,6-di-*t*-butyl-*p*-cresol required to effect the process of this invention can vary from about 0.01 percent to about 2 percent by weight and from about 0.005 percent to about 0.5 percent by weight respectively based on the total weight of the reactants used. While amounts in excess of those set forth above can be utilized they do not result in any increased benefit or improvement that would warrant the increased expense resulting therefrom.

The phosphoric acids which are suitable for use in the present invention are any of the commercially available grades and forms. Examples of suitable acids are hypophosphoric acid, pyrophosphoric acid, metaphosphoric acid and orthophosphoric acid.

The preparation of the color improved polyesters of the present invention is more specifically illustrated in the following examples.

EXAMPLE 1

Preparation of a Color Improved Polyester of Propylene Glycol, Maleic Anhydride and Chlorendic Anhydride Propylene glycol (83.7 grams; 1.1 mol), maleic anhydride (49.0 grams; 0.5 mol) and phosphoric acid (0.112 grams; 85 percent assay) and 2,6-di-*t*-butyl-*p*-cresol (0.095 grams) dissolved in a small amount of ethylene glycol monomethyl ether were charged into a 500 ml. glass reaction vessel equipped with a mechanical stirrer, thermometer, gas inlet tube, reflux condenser and water trap. The mixture was heated with stirring until the maleic anhydride dissolved and chlorendic anhydride (185.4 grams; 0.5 mol) was added thereto. Nitrogen gas was then bubbled into the reaction mixture and heating and stirring were continued while maintaining the temperature of the mixture at about 177° C. for a period of about 5 hours. After this time the reaction mixture was poured into a glass dish to cool yielding the desired color improved polyester of propylene glycol, maleic anhydride and chlorendic anhydride having the following properties:

Acid No. 27.5
Softening Point
(Ring and Ball Method) 84° C.
Gardner Color <1

EXAMPLE 2

Preparation of a Color Improved Polyester of Diethylene Glycol, Fumaric Acid and Chlorendic Anhydride Diethylene glycol (106 grams; 1.0 mol), fumaric acid (58 grams; 0.5 mol) and phosphoric acid (0.021 grams; 85 percent assay) and 2,6-di-*t*-butyl-*p*-cresol (0.01 grams) dissolved in a minimal amount of ethylene glycol monomethyl ether are charged into a glass reaction flask equipped with a mechanical stirrer, thermometer, gas inlet tube, reflux condenser and water trap. The mixture is heated with stirring to a temperature of about 60° C. and chlorendic anhydride (185.4 grams; 0.5 mol) is added thereto. Nitrogen gas is bubbled into the reaction mixture which is then further heated to a temperature of about 190° C. The water of esterification liberated during the reaction is separated and the acid number of the reaction mixture is periodically determined to monitor the reaction. When an acid number of about 50 is approached heating is discontinued and the product is poured into a shallow pan and allowed to cool yielding the desired color improved polyester of diethylene glycol, fumaric acid and chlorendic anhydride.

EXAMPLE 3

Preparation of a Color Improved Polyester of Butylene Glycol, Citraconic Acid and Chlorendic Anhydride Butylene glycol (180 grams; 2 mol), citraconic acid (130.0 grams; 1.0 mol) and phosphoric acid (4.4 grams; 85 percent assay) and 2,6-di-*t*-butyl-*p*-cresol (1.8 grams) dissolved in a minimal amount of ethylene glycol monomethyl ether are charged into a glass reaction flask equipped with a mechanical stirrer, thermometer, gas inlet tube, reflux condenser and water trap. The mixture is heated to about 100° C. and chlorendic anhydride (371 grams; 1.0 mol) is added thereto. The reaction mixture is them blanketed with nitrogen gas and is heated with stirring to a temperature of about 170° C. The water of esterification liberated during the reaction is separated and the acid number of the reaction mixture is periodically determined to monitor the reaction. When an acid number of about 60 is approached heating is discontinued and the product is poured into a shallow dish and allowed to cool yielding the desired color improved polyester of butylene glycol, citraconic acid and chlorendic anhydride.

EXAMPLE 4

Preparation of a Color Improved Polyester of Ethylene Glycol, Maleic Anhydride and Chlorendic Anhydride Ethylene glycol (124 grams; 2.0 mol), maleic anhydride (98 grams; 1.0 mol) and phosphoric acid (0.44 grams; 85 percent assay) and 2,6-di-*t*-butyl-*p*-cresol (0.2 grams) dissolved in a minimal amount of ethylene glycol monomethyl ether are charged into a glass reaction flask equipped with a mechanical stirrer, thermometer, gas inlet tube, reflux condenser and water trap. The mixture is heated to a temperature of about 70° C. and chlorendic anhydride (371 grams; 1.0 mol) is added thereto. The reaction mixture is then blanketed with nitrogen gas and is heated with stirring at a temperature of about 150° C. The water of esterification liberated during the reaction is separated and the acid number of the reaction mixture is determined periodically to monitor the reaction. When an acid number of about 40 is approached heating is discontinued and the product is poured into a shallow dish and allowed to cool yielding the desired color improved polyester of ethylene glycol, maleic anhydride and chlorendic anhydride.

EXAMPLE 5

Preparation of a Color Improved Polyester of 2-Butenediol-1,4, Adipic Acid and Chlorendic Anhydride 2-Butenediol-1,4 (176 grams; 2.0 mol), adipic acid (146 grams; 1.0 mol), chlorendic anhydride (371 grams; 1.0 mol), phosphoric acid (0.5 grams; 85 percent assay), 2,6-di-*t*-butyl-*p*-cresol (0.3 grams) and toluene (250 ml.) are charged into a reaction vessel equipped with a mechanical stirrer, thermometer, reflux condenser and water trap. The reaction mixture is heated, with stirring at the reflux temperature while removing the water of esterification as it is formed. The acid number of the reaction mixture is determined periodically to monitor the reaction. When an acid number of about 30 is approached the toluene is stripped from the reaction mixture by heating under reduced pressure to yield the desired color improved polyester of 2-butenediol-1,4, adipic acid and chlorendic anhydride.

The effectiveness of the combination of phosphoric acid and 2,6-di-*t*-butyl-*p*-cresol for improving the color of unsaturated fire retardant polyesters comprising the reaction product of at least one polyhydric alcohol, a polycarboxylic compound and a compound selected from the group consisting of chlorendic acid or its anhydride was demonstrated in experiments wherein the preparation of polyesters without color improving additives and wherein the preparation of polyesters in the presence of phosphoric acid alone and 2,6-di-*t*-butyl-*p*-cresol alone was carried out and compared to a polyester in accordance with the present invention.

In one experiment a series of four polyester resins was prepared in a manner similar to that detailed in example 1. Resin No. 1 was prepared without the use of any additives. Resin No. 2 was prepared in the presence of phosphoric acid, Resin No. 3 was prepared in the presence of 2,6-di-*t*-butyl-*p*-cresol and Resin No. 4 was prepared in the presence of a combination of both phosphoric acid and 2,6-di-*t*-butyl-*p*-cresol.

The chlorendic anhydride used in the preparation of the four resins had the following physical properties:

| | |
|---|---|
| Chlorendic Anhydride Assay, % | 95.9 |
| Impurities | |
| Chlorendic Acid, % | 2.6 |
| Maleic Anhydride, % | 0.3 |
| Volatiles, % | 1.1 |
| Hexachlorocyclopentadiene, % | 0.05 |
| Iron, p.p.m. | 2.5 |
| Color (Hazen, APHA) | 100 |

The results of this experiment are presented in the following table.

| Resin No. | Additive | Concentration of Additive Based on Total Weight of Reactants | Resin Color (Gardner) |
|---|---|---|---|
| 1 | None | | 16 |
| 2 | Phosphoric Acid | 2% | 13 |
| 3 | 2,6-Di-$t$-butyl-$p$-cresol | 0.03% | 12 |
| 4 | Phosphoric Acid + 2,6-Di-$t$-butyl-$p$-cresol | 0.075%+0.03% | 3-4 |

I claim:

1. A composition of matter comprising an unsaturated polyester of a polyhydric alcohol and chlorendic acid or anhydride and a color inhibiting amount therefor of phosphoric acid and 2,6-di-$t$-butyl-$p$-cresol.

2. The composition of claim 1 wherein phosphoric acid is present in an amount of from 0.01 to 2 percent and 2,6-di-$t$-butyl-$p$-cresol is present in an amount of from 0.005 to 0.5 percent, based on the weight of polymer's monomeric precursors.

3. A polyester composition as recited in claim 1 wherein the color inhibitors are present during the esterification reaction of the polyester's formation.

4. A polyester composition as recited in claim 2 wherein the color inhibitors are present during the esterification reaction of the polyester's formation.